April 19, 1960 — L. J. MALTBY — 2,933,271
LANDING GEAR FOR HELICOPTERS
Filed July 9, 1954 — 3 Sheets-Sheet 1
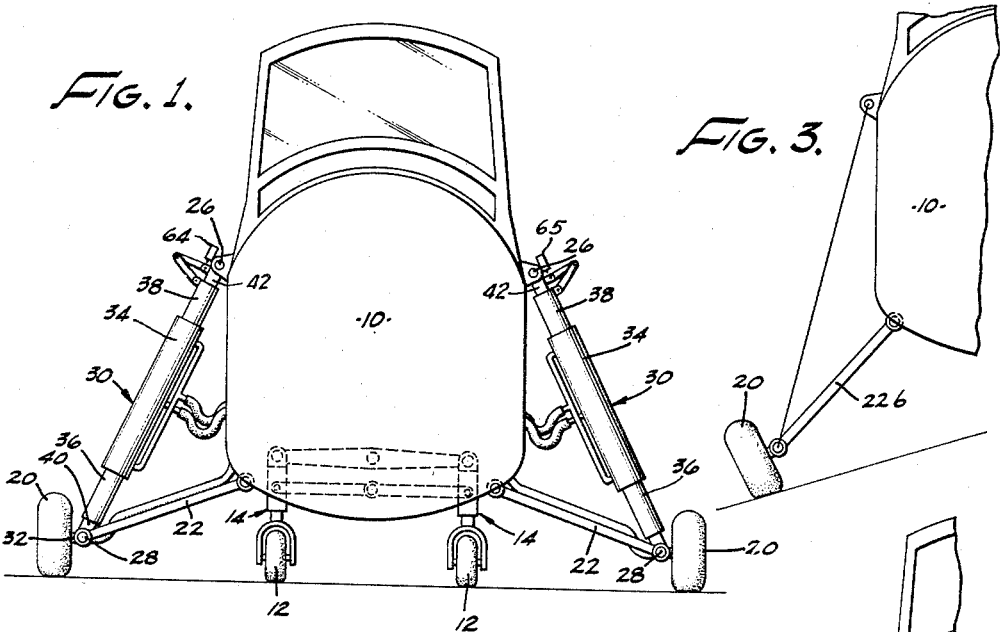
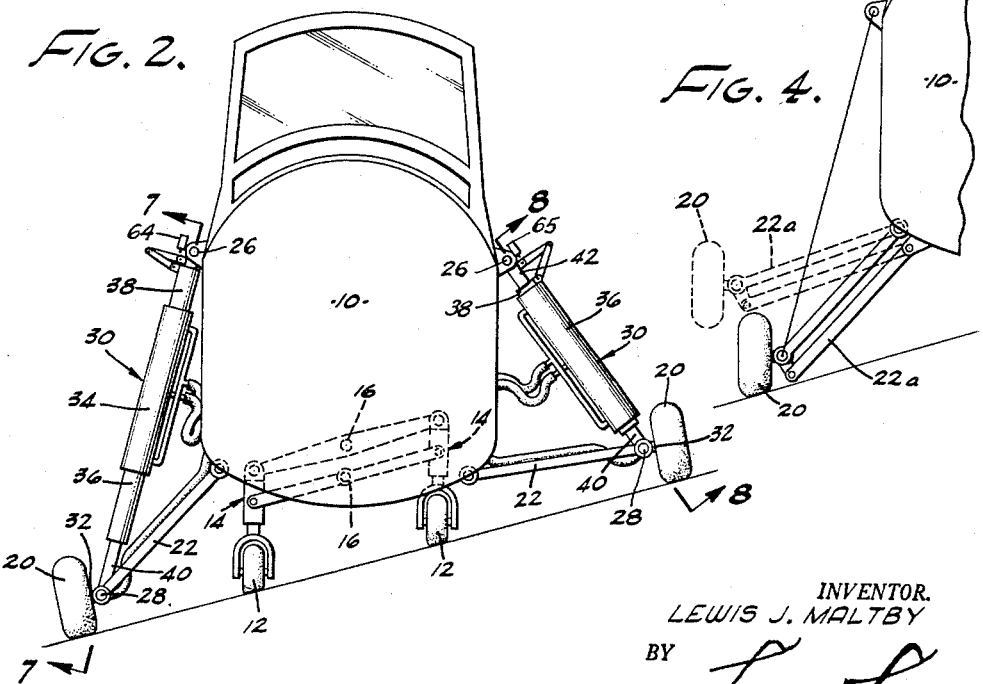
INVENTOR.
LEWIS J. MALTBY
BY
ATTORNEYS April 19, 1960    L. J. MALTBY    2,933,271
LANDING GEAR FOR HELICOPTERS
Filed July 9, 1954    3 Sheets-Sheet 2
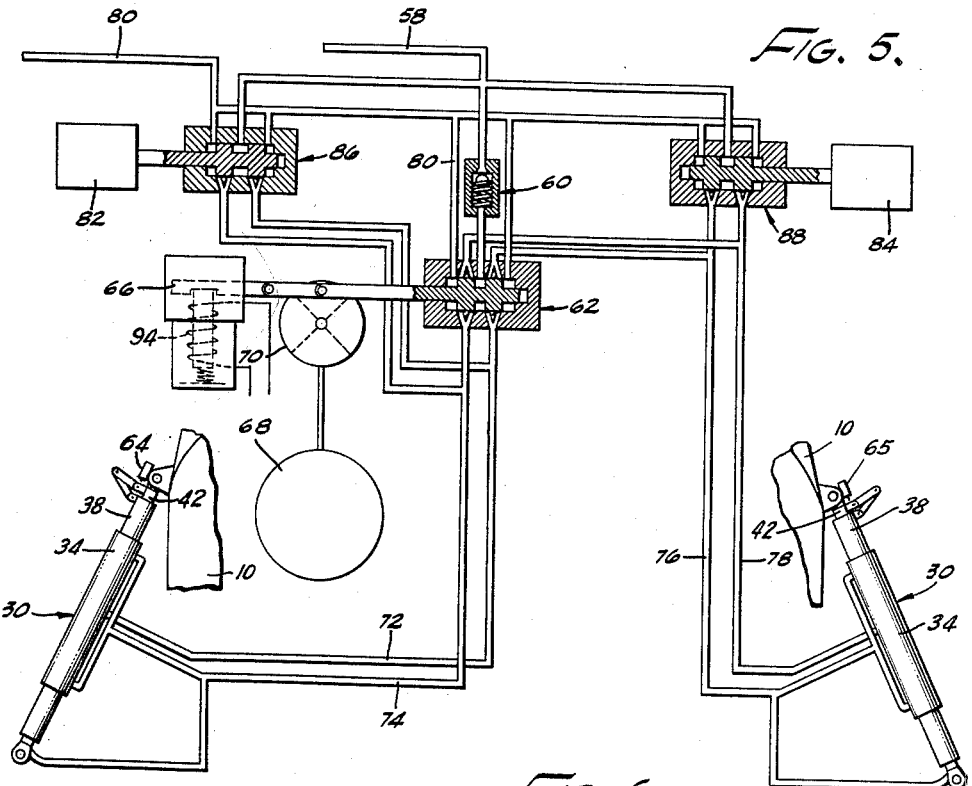
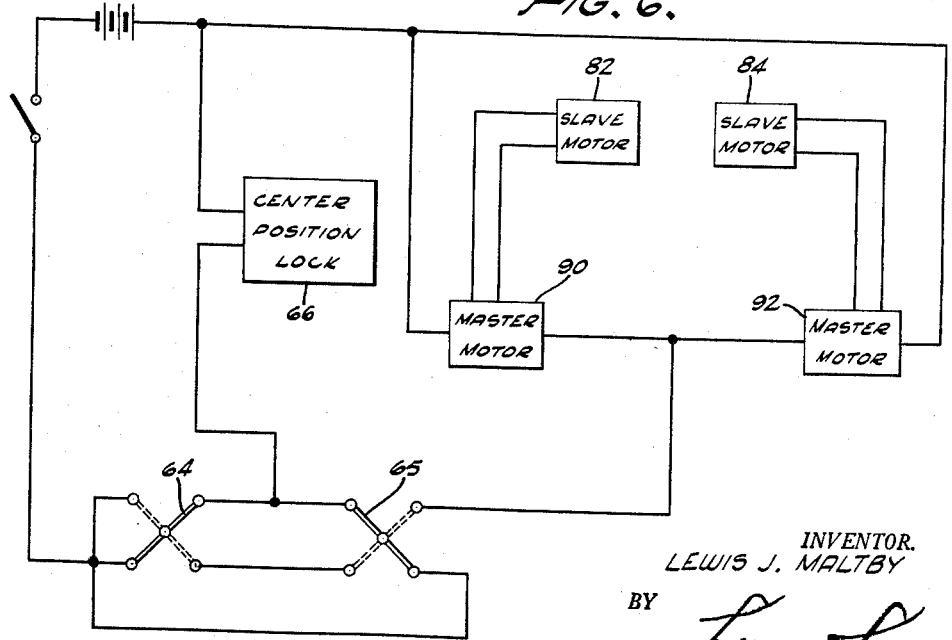
INVENTOR.
LEWIS J. MALTBY
BY
*Lyon & Lyon*
ATTORNEYS April 19, 1960
L. J. MALTBY
2,933,271
LANDING GEAR FOR HELICOPTERS
Filed July 9, 1954
3 Sheets-Sheet 3
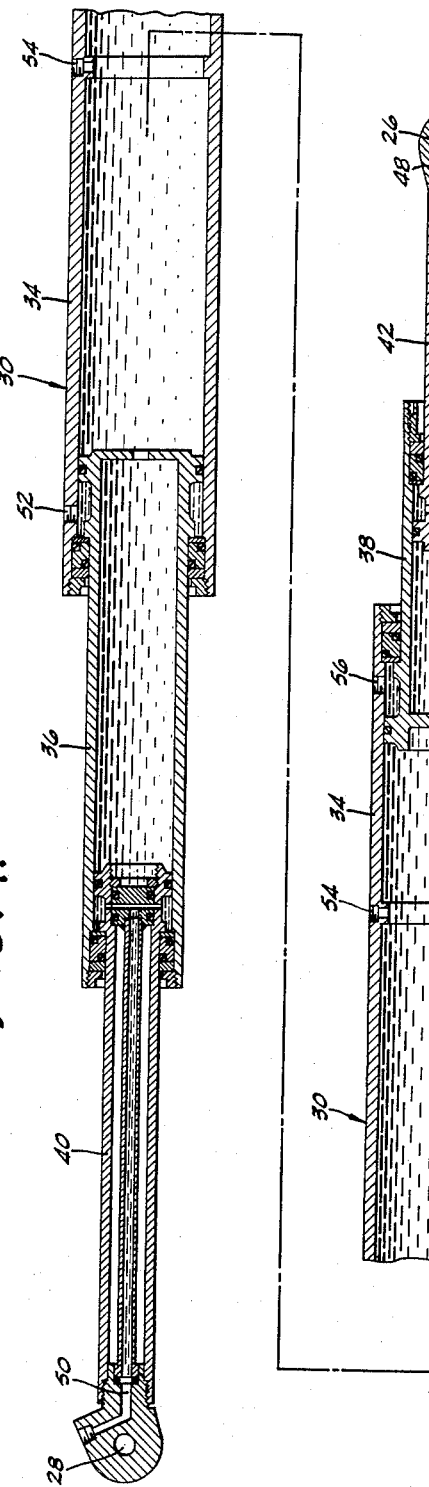
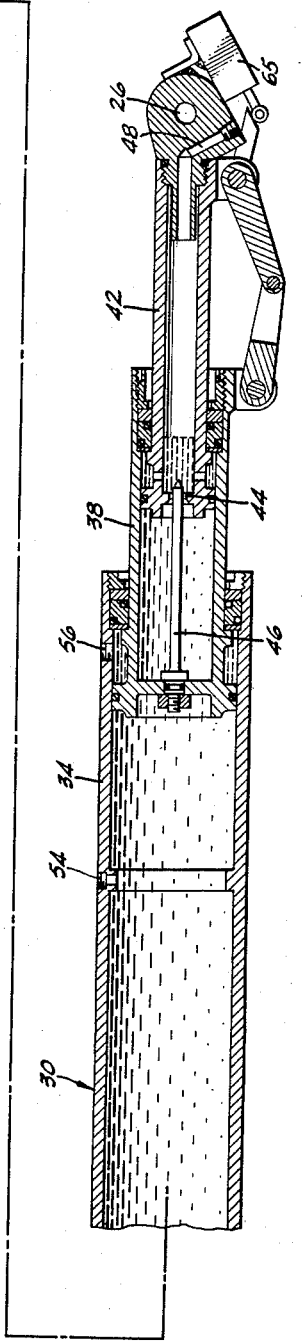
INVENTOR.
LEWIS J. MALTBY
BY
ATTORNEYS

United States Patent Office 2,933,271
Patented Apr. 19, 1960

2,933,271

LANDING GEAR FOR HELICOPTERS

Lewis J. Maltby, Burbank, Calif., assignor to Menasco Manufacturing Company, Burbank, Calif., a corporation of California Application July 9, 1954, Serial No. 442,382

11 Claims. (Cl. 244—103)

This invention relates to aircraft landing gear and particularly to landing gear of aircraft which are capable of vertical ascent and descent.

The usefulness of a helicopter is seriously limited by the roughness and inclination of the terrain and in many instances it is impossible to land. The usual practice in such instances is to hover the aircraft with one wheel engaging the ground. Such practice is difficult and dangerous.

It is an object of this invention to provide landing gear which will adapt such an aircraft to land on a hillside or upon rough terrain.

It is a further object of this invention to provide a landing gear utilizing a combined hydraulic actuator and shock absorber.

It is still a further object of this invention to provide an aircraft which is self leveling when the wheels are in contact with the ground.

Further objects and advantages will be readily apparent from the following description.

In the drawings:

Figure 1 is a front elevation of a helicopter utilizing landing gear embodying this invention.

Figure 2 is a view similar to Figure 1 with the helicopter on uneven terrain. The main wheel axles in this case are integral with the main actuators.

Figure 3 is a schematic view of the wheel position of a modification obtained with the axle integral with the side brace.

Figure 4 is a schematic view similar to Figure 3 of a further modified form of the landing gear.

Figure 5 is a diagrammatic view of the hydraulic control system.

Figure 6 is a diagrammatic view of the electrical control system.

Figure 7 is a section taken along line 7—7 of Figure 2.

Figure 8 is a section taken along line 8—8 of Figure 2.

In the principal embodiment illustrated the fuselage 10 is provided with nose wheels 12 which are mounted upon shock absorbers 14 which are opposed legs of a parallelogram pivotally mounted upon the fuselage at points 16. The main landing gear comprises wheels 20 which are mounted upon braces 22 which in turn are pivotally mounted upon fuselage 10. The braces 22 may be a single brace or a V brace, such as are in use in many helicopters or as illustrated in the modification of Figure 4 and may constitute a parallelogram 22$^a$, which will maintain the wheels vertical at all times.

The remaining brace 30 is pivotally mounted to the fuselage as at 26 and to the brace 22 as at 28. The brace 30 is a combination hydraulic actuator and shock absorber. The actuator is integral with the axle 32 of the wheel 20 in the principal embodiment while connected to the parallelogram 22$^a$ in the modification of Figure 4, and the axle 32 is integral with brace 22$^b$ in the modification of Figure 3. The three alternatives thus presented vary the wheel angles with the ground; thus in the embodiment of Figures 1 and 2, the wheels are at a constant angle with respect to the brace 30 in the embodiment of Figure 3, at a constant angle with respect to brace 22$^b$ and in the embodiment of Figure 4 are vertical at all times. The selection of which embodiment is dependent upon the structural characteristics of the particular aircraft.

Referring now more particularly to Figures 7 and 8, the details of the combination actuator and shock absorber are illustrated. A central cylinder 34 is provided into which hollow actuator pistons 36 and 38 project. Into the actuator pistons project another actuator piston 40 and the shock absorber piston 42. Upon contact with the ground the shock absorber piston 42 enters actuator piston 38. The shock absorber thus formed is provided with an orifice 44 and a metering pin 46, permitting oil to be metered through orifice 44 as the shock absorber piston 42 enters actuator piston 38 at the same time compressing air inside piston 42.

An air and oil service port 48 is provided for a conventional air inlet valve to seal the air pressure in the shock absorber. A fluid port 50 is provided so that fluid can be supplied to the lower face of piston 40.

The cylinder 34 is provided with three inlet ports 52, 54 and 56. When fluid under pressure is supplied through port 54 and fluid drained through ports 50, 52 and 56, the pistons 36, 38 and 40 move away from one another to the expanded position as in Figure 7. When fluid is supplied through ports 50, 52 and 56 and drained from port 54, the pistons 36, 38 and 40 retract within the cylinder.

The system for controlling the flow of fluid is illustrated in Figures 5 and 6. The flow of fluid, of course, expands or contracts each combination actuator and shock absorber 30 connected to wheels 20 and hence positions the fuselage 10 with respect to wheels 20, irrespective of whether said wheels are on level ground as in Figure 1 or on a hillside as in Figure 2.

Fluid from the aircraft's hydraulic system is supplied through line 58. A one-way spring loaded ball check valve 60 is located in line 58 on the pump pressure side of the system to prevent an excessive back pressure being put on the aircraft hydraulic system during the landing impact. The fluid is supplied to self leveling control valve 62.

Referring now to the wiring diagram, a pair of snap switches 64 and 65 are provided, one located adjacent the shock absorber piston 42 of each combination actuator and shock absorber 30. The switches are actuated either externally or internally by the shock absorber piston 42 as it leaves or reaches its fully extended position. With both wheels in engagement with the ground the switches are in the position indicated in Figure 6, energizing the solenoid 94 to release the solenoid operated center position lock 66, freeing the valve element of the self leveling control valve 62. This valve is then positioned by the pendulum 68. Oscillation of the pendulum is minimized by damper 70. The positioning of the valve will supply fluid to whichever wheel 20 is at the lowest level. Assuming the wheel associated with the left combination actuator and shock absorber 30 in Figure 5 is the lowest, fluid is supplied through line 72 to port 54 and fluid is exhausted through line 74 from ports 50, 52 and 56, at the same time the right combination actuator and shock absorber is being contracted so that fluid is being supplied through lines 76 and exhausted through line 78 to the valve 62 and hence through line 80. When the position of valve 62 is changed, of course, the right unit 30 may be expanded and the left unit contracted.

When the wheels 20 no longer touch the ground the snap switches shift to the dotted line position in Figure 6, closing the circuits to the electrically controlled valve actuators 82 and 84 controlling gear position sensing valves 86 and 88. The circuit to solenoid 66 is open and the center position lock holds valve 62 in the closed position, blocking off the flow of fluid from line 58 through valve 62. The gear position sensing units 90 and 92 are positioned adjacent the pivotal connection between brace 22 and fuselage 10 and move with brace 22. Each unit 82 and 84 is the slave or driven motor of a synchronous motor system of which the sensing units 90 and 92 are the master or driving motors.

The slave units 82 and 84 following the position of units 90 and 92 control the valve elements of valves 86 and 88. Fluid is delivered to or exhausted from lines 72, 74, 76 and 78 as required to position wheels 20 in a neutral position. In this position, actuator pistons 36 and 38 are fully extended, piston 40 is fully retracted inside piston 36, and shock absorber piston 42 has been fully extended by the compressed air contained within piston 42. When the wheels are at this position, the driving motors are shut off, opening the circuits to valve actuators 82 and 84, permitting the valve elements of valves 86 and 88 to be locked in the central position by a solenoid in actuators 82 and 84, respectively, blocking off flow therethrough.

Upon landing whichever wheel engages the ground first actuates the energizing solenoid 94 freeing valve 62 to permit the pendulum 68 to position the valve 62 and hence the fuselage 10 with respect to the wheels 20. When the aircraft take off the shock absorber piston 42 moves out of piston 38 and the switches are shifted to the dotted line position in Figure 6.

While what hereinabove has been described is the preferred embodiment of this invention, it is readily apparent that alterations and modifications can be resorted to without departing from the scope of this invention and such alterations and modifications are intended to be included within the scope of the appended claims.

I claim:

1. In a vertically ascending and descending aircraft the combination of: a pair of wheels, brace means pivotally mounting each of said wheels to said aircraft, additional brace means pivotally mounting each of said wheels to said aircraft at a point removed from the pivotal mounting of said first mentioned braces, an actuator in each additional brace means having a cylinder and piston therein, means connected to said cylinder supplying fluid under pressure to either side of said piston thereby varying the length of said additional brace means, and means connected to said fluid supplying means sensitive to vertical position of said aircraft controlling flow of said fluid under pressure to maintain the fuselage of said aircraft vertical.

2. In a vertically ascending and descending aircraft the combination of: a pair of wheels, brace means pivotally mounting each of said wheels to said aircraft, additional brace means pivotally mounting each of said wheels to said aircraft at a point removed from the pivotal mounting of said first mentioned braces, an actuator in each additional brace means having a cylinder and piston therein, means connected to said cylinder supplying fluid under pressure to either side of said piston thereby varying the length of said additional brace means, and means connected to said fluid supplying means sensitive to vertical position of said aircraft controlling flow of said fluid under pressure to maintain the fuselage of said aircraft vertical, said last mentioned means being operative upon engagement of either wheel with the ground.

3. In a vertically ascending and descending aircraft the combination of: a pair of wheels, brace means pivotally mounting each of said wheels to said aircraft, additional brace means pivotally mounting each of said wheels to said aircraft at a point removed from the pivotal mounting of said first mentioned braces, an actuator in each additional brace means having a cylinder and piston therein, means connected to said cylinder supplying fluid under pressure to either side of said piston thereby varying the length of said additional brace means, means connected to said fluid supplying means sensitive to vertical position of said aircraft controlling flow of said fluid under pressure to maintain the fuselage of said aircraft vertical, said last mentioned means being operative upon engagement of either wheel with the ground, and means connected to said fluid supplying means and controlling flow of said fluid under pressure to adjust each of said additional brace means to an equal length upon removal of said wheels from the ground.

4. In a vertically ascending and descending aircraft the combination of: a pair of wheels, brace means pivotally mounting each of said wheels to said aircraft, additional brace means pivotally mounting each of said wheels to said aircraft at a point removed from the pivotal mounting of said first mentioned braces, means in said additional brace means for varying the length thereof, wherein said length varying means comprises a cylinder, a pair of opposed pistons in said cylinder, means connected to said cylinder for supplying fluid under pressure on either side of either piston, and means connected to said fluid supplying means sensitive to vertical position of said aircraft controlling flow of said fluid under pressure to maintain the fuselage of said aircraft vertical.

5. In a vertically ascending and descending aircraft the combination of: a pair of wheels, brace means pivotally mounting each of said wheels to said aircraft, additional brace means pivotally mounting each of said wheels to said aircraft at a point removed from the pivotal mounting of said first mentioned braces, means in said additional brace means for varying the length thereof, wherein said length varying means comprises a cylinder, a pair of opposed pistons in said cylinder, means connected to said cylinder for supplying fluid under pressure to either side of either piston, and means connected to said fluid supplying means sensitive to vertical position of said aircraft controlling flow of said fluid under pressure to maintain the fuselage of said aircraft vertical, said last mentioned means being operative upon engagement of either wheel with the ground.

6. In a vertically ascending and descending aircraft the combination of: a pair of wheels, brace means pivotally mounting each of said wheels to said aircraft, additional brace means pivotally mounting each of said wheels to said aircraft at a point removed from the pivotal mounting of said first mentioned braces, means in said additional brace means for varying the length thereof, wherein said length varying means comprises a cylinder, a pair of opposed pistons in said cylinder, means connected to said cylinder for supplying fluid under pressure to either side of either piston, means connected to said fluid supplying means sensitive to vertical position of said aircraft controlling flow of said fluid under pressure to maintain the fuselage of said aircraft vertical, said last mentioned means being operative upon engagement of either wheel with the ground, and means controlling flow of said fluid under pressure to adjust each of said additional brace means to an equal length upon removal of said wheels from the ground.

7. In a vertically ascending and descending aircraft the combination of: a pair of wheels, brace means pivotally mounting each of said wheels to said aircraft, additional brace means pivotally mounting each of said wheels to said aircraft at a point removed from the pivotal mounting of said first mentioned braces, means in said additional brace means for varying the length thereof, wherein said length varying means comprises a cylinder, a pair of opposed pistons in said cylinder, a shock absorber associated with one of said pistons, means connected to said cylinder for supplying fluid under pressure to either side of either piston, and means connected to said fluid supplying means sensitive to vertical position of said aircraft controlling flow of said fluid under pressure to maintain the fuselage of said aircraft vertical.

8. In a vertically ascending and descending aircraft the combination of: a pair of wheels, brace means pivotally mounting each of said wheels to said aircraft, additional brace means pivotally mounting each of said wheels to said aircraft at a point removed from the pivotal mounting of said first mentioned braces, means in said additional brace means for varying the length thereof, wherein said length varying means comprises a cylinder, a pair of opposed pistons in said cylinder, a third piston telescopically received within one of said opposed pistons, means connected to said cylinder for supplying fluid under pressure to either side of each of said pistons, and means connected to said fluid supplying means sensitive to vertical position of said aircraft controlling flow of said fluid under pressure to maintain the fuselage of said aircraft vertical.

9. In a vertically ascending and descending aircraft the combination of: a pair of wheels, brace means pivotally mounting each of said wheels to said aircraft, additional brace means pivotally mounting each of said wheels to said aircraft at a point removed from the pivotal mounting of said first mentioned braces, means in said additional brace means for varying the length thereof, wherein said length varying means comprises a cylinder, a pair of opposed pistons in said cylinder, a shock absorber piston telescopically received within one of said pistons, means connected to said cylinder for supplying fluid under pressure to either side of either piston, and means connected to said fluid supplying means sensitive to vertical position of said aircraft controlling flow of said fluid under pressure to maintain the fuselage of said aircraft vertical.

10. In a vertically ascending and descending aircraft the combination of: a pair of wheels, brace means pivotally mounting each of said wheels to said aircraft, additional brace means pivotally mounting each of said wheels to said aircraft at a point removed from the pivotal mounting of said first mentioned braces, means in said additional brace means for varying the length thereof, wherein said length varying means comprises a cylinder, a pair of opposed pistons in said cylinder, a third piston telescopically received within one of said opposed pistons and means connected to said cylinder for supplying fluid under pressure to either side of each of said pistons, a shock absorber piston telescopically received within the remaining of said opposed pistons, and means connected to said fluid supplying means sensitive to vertical position of said aircraft controlling flow of said fluid under pressure to maintain the fuselage of said aircraft vertical.

11. In a vertically ascending and descending aircraft the combination of: a pair of wheels, brace means pivotally mounting each of said wheels to said aircraft, additional brace means pivotally mounting each of said wheels to said aircraft at a point removed from the pivotal mounting of said first mentioned braces, means in said additional brace means for varying the length thereof, wherein said length varying means comprises a cylinder, a pair of opposed pistons in said cylinder, a third piston telescopically received within one of said opposed pistons, means connected to said cylinder for supplying fluid under pressure to either side of each of said pistons, a shock absorber piston telescopically received within the remaining of said opposed pistons, means connected to said fluid supplying means sensitive to vertical position of said aircraft controlling flow of said fluid under pressure to maintain the fuselage of said aircraft vertical, and part means supplying fluid and air under pressure to said shock absorber piston.

References Cited in the file of this patent

UNITED STATES PATENTS

| | | |
|---|---|---|
| 1,780,531 | Messier | Nov. 4, 1930 |
| 1,918,426 | Radnor | July 18, 1933 |
| 1,918,697 | Gruss | July 18, 1933 |
| 2,139,192 | Krekel | Dec. 6, 1938 |
| 2,278,081 | Kramer | Mar. 31, 1942 |
| 2,365,387 | Briscoe | Dec. 19, 1944 |
| 2,563,194 | Shawbrook | Aug. 7, 1951 |
| 2,679,827 | Perdue | June 1, 1954 |

FOREIGN PATENTS

| | | |
|---|---|---|
| 483,365 | Italy | July 24, 1953 |
| 618,914 | Great Britain | Mar. 1, 1949 |
| 819,026 | France | June 28, 1937 |